A. T. WARREN.
AUTOMATIC WATER SUPPLY APPARATUS.
APPLICATION FILED MAR. 7, 1913.
1,096,519.
Patented May 12, 1914.
2 SHEETS—SHEET 2.
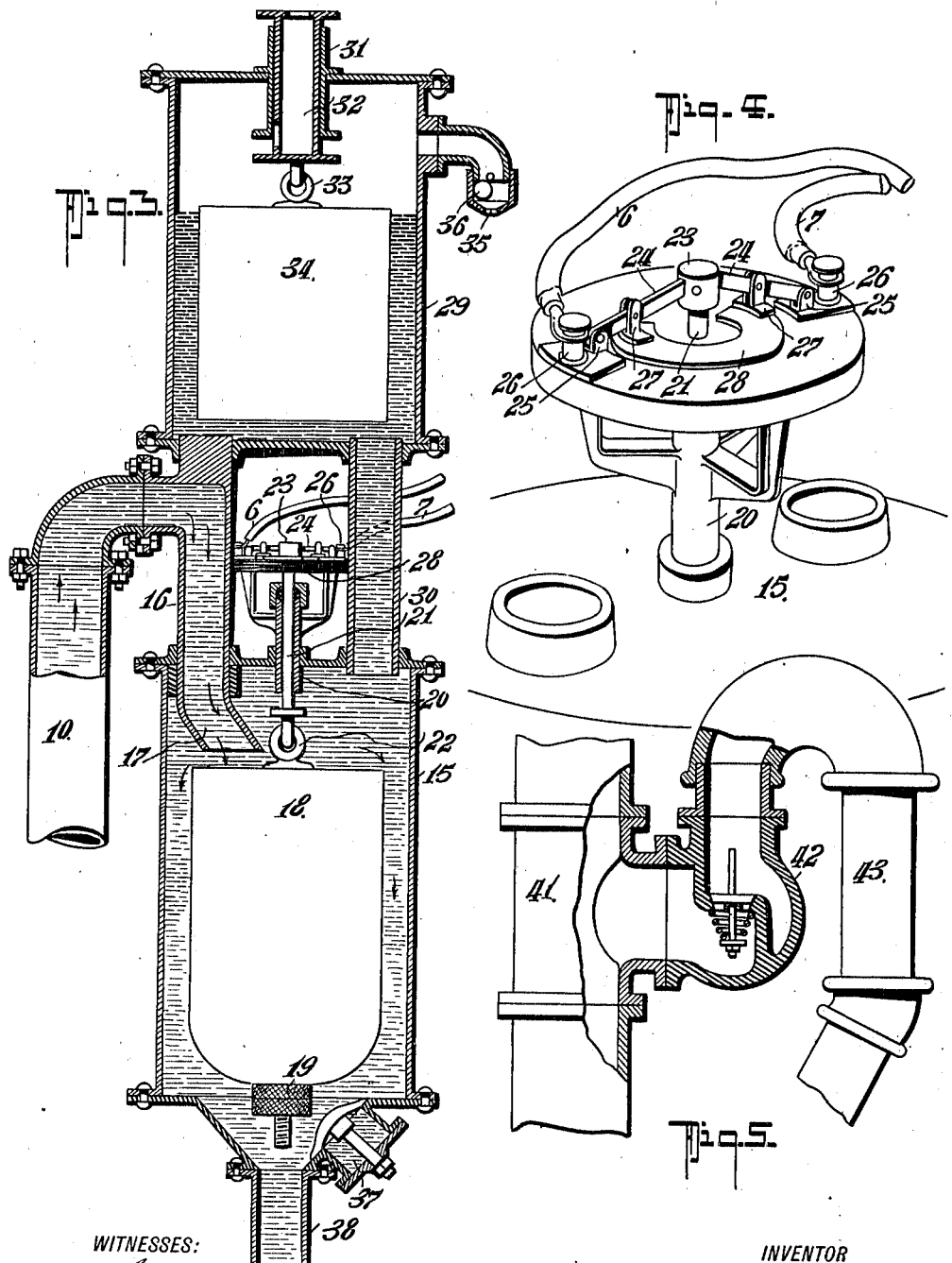
WITNESSES:
INVENTOR
Alfred T. Warren.
BY
Fred G. Dieterich
ATTORNEYS

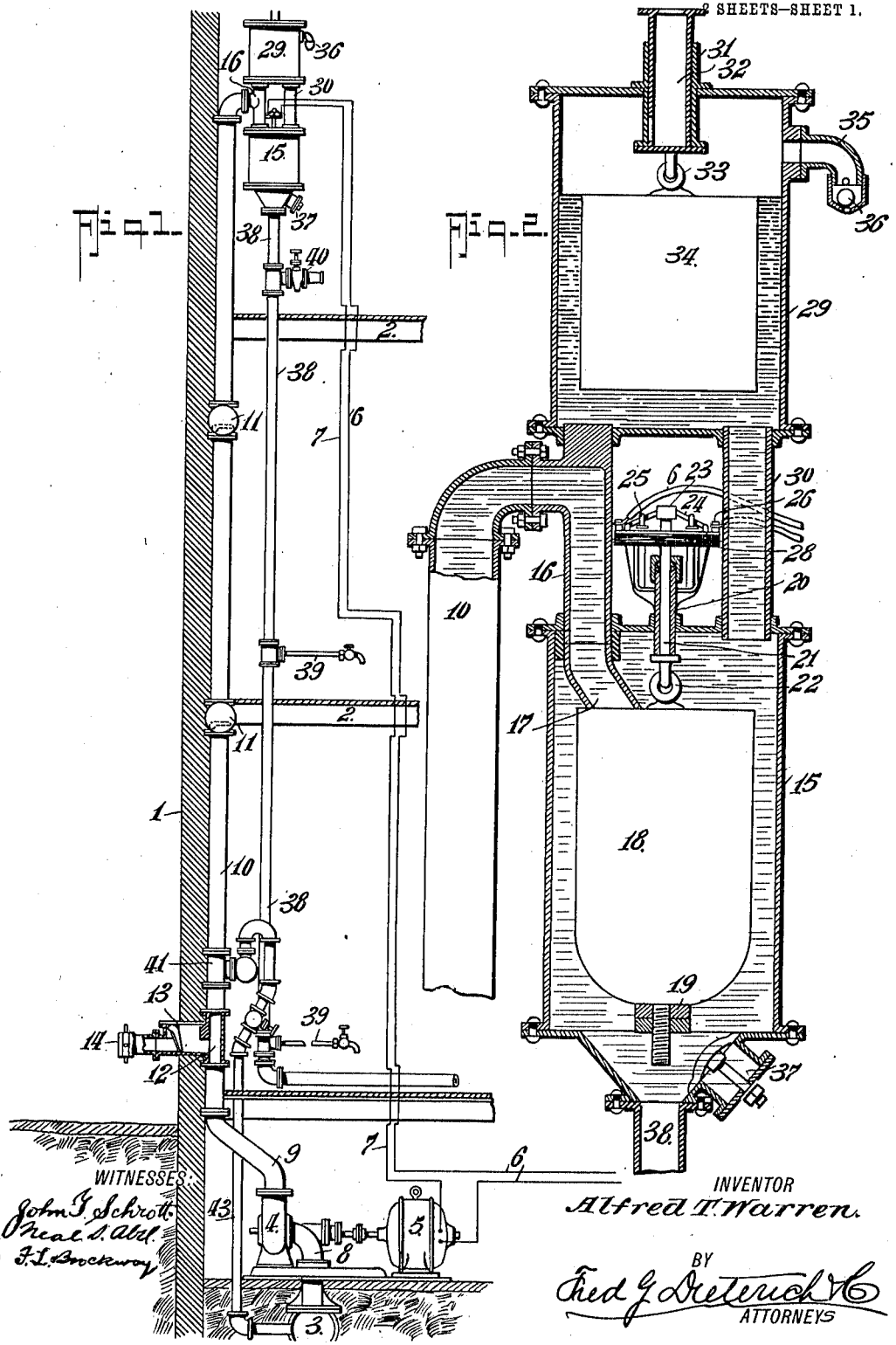

UNITED STATES PATENT OFFICE.

ALFRED T. WARREN, OF NEW YORK, N. Y.

AUTOMATIC WATER-SUPPLY APPARATUS.

1,096,519.  Specification of Letters Patent.  Patented May 12, 1914.

Application filed March 7, 1913. Serial No. 752,668.

*To all whom it may concern:*

Be it known that I, ALFRED T. WARREN, residing at New York, in the county of New York and State of New York, have invented certain new and useful Improvements in Automatic Water - Supply Apparatus, of which the following is a specification.

My invention has for its object to provide a system of water distribution for tall buildings and the like. The present practice is usually to place a tank or reservoir at the top of the building into which the water is pumped from below. The pump motor being controlled by a float device in the tank whereby when the water level in the tank falls below a predetermined point, the pump will be automatically started up to refill the tank. The refilling operations are intermittent and variable in point of time. The service pipes for the building receive their supply from this tank. This arrangement is unsanitary owing to the accumulation of filth in the tank, and the tank water can seldom be employed for drinking purposes on that account. Again, in case of fire within the building, or a disablement of the pump, the service pipes cannot get an adequate supply of water from the tank which soon becomes emptied and the system is thus put out of commission.

It is to overcome the foregoing features that my invention has been devised.

Primarily my invention has for its object to provide a system of distribution in which the use of a reservoir or storage tank is eliminated; a system in which the pump is not actuated save at the time the service pipe is open and then only for a period of time substantially equal to the time the water is flowing out of the service pipe, thus a constant flow of fresh water is obtained so long as the outlet or outlets of the service pipe are open.

Another object is to provide a system of a construction whereby in case of fire, an external pumping engine (such as a fire engine) may be connected with the discharge pipe of the pump, either to assist the house pump or to act in lieu of the same should the house pump become disabled.

The invention in its generic nature comprises a pump and preferably an electric motor for operating it, the intake side of the pump being connected with the supply main while the outlet side is connected to a stand pipe which extends up to the highest location in the building. At this point the service pipe delivers into an automatic controller which includes a switching device for controlling the action of the pump motor, whereby when a current of water is flowing through the controller the motor will be set into action to drive the pump and whereby when the flow of water ceases, the pump motor will be automatically stopped.

More subordinately the invention includes those novel details of construction, combination and arrangement of parts, all of which will be first fully described, then be specifically pointed out in the appended claims, reference being had to the accompanying drawings, in which:—

Figure 1 is a diagrammatic elevation showing the general application of the invention. Fig. 2 is an enlarged vertical section of the controller in its position of rest with the pump motor circuit open. Fig. 3 is a view similar to Fig. 2 showing the parts when the house service pipe has been opened to permit the flow of water, the pump motor circuit being closed to start the pump. Fig. 4 is an enlarged perspective view of the circuit closing switch. Fig. 5 is an enlarged detail sectional view of the by-pass valve.

1 is the building which may be of any ordinary height and divided by the floors 2.

3 designates the water supply main from which the water is taken into the system which constitutes my invention. The supply main is piped up with the intake 8 of the water pump 4. The pump 4 may be of any approved construction and may be driven by any suitable motor 5, an electric motor being shown by preference. The motor 5 has one of its terminals connected to a line wire 6 and its other terminal connected to a wire 7. The wire 7 extends to one of the fixed contacts 26 of the switch (see Fig. 4), while the other line wire 6 connects to the other fixed contact 26 of such switch. The outlet 9 of the pump delivers into a stand pipe 10 that extends to the highest part of the system and is preferably provided with back check valves 11 as indicated in Fig. 1 of the drawings.

12 designates a T connected in the stand pipe 10 and carrying a back check valve 13 and a plug inlet 14 to which a fire engine (not shown) may be connected for a purpose later explained.

The controller which is best shown in Figs. 2 and 3 of the drawings is composed of a cylinder 15 above which is located a second cylinder 29, the cylinders 29 and 15 being connected together by pipes 16 and 30, the pipe 30 affording communication between the two cylinders, while the pipe 16 does not. The pipe 16 however, has communication with the cylinder 15 and it is to the pipe 16 that the stand pipe 10 is connected, as best indicated in Fig. 2 of the drawings.

17 is the discharge end of the pipe or duct 16, and it is adapted to have its mouth closed by a sensitive float 18 when no water is flowing. The float 18 carries weights 19 which are removable through the hand hole 37 in order that more or less weight may be added to the float 18 to increase or diminish its sensitiveness as may be required in the particular installation. The cylinder 15 has a neck 20 through which a rod 21 passes. The rod 21 is connected at 22 to the float 18 and projects through the neck 20 to the outside of the cylinder 15. On its outer end the rod 21 carries an insulating block 23 into slots of which the ends of the switch levers 24 project. The switch levers 24 are mounted at 25 on the fixed contacts 26 and carry contact shoes 27 to engage the connecting plate 28 when the levers 24 are down, the plate 28 and contacts 26 being mounted on a suitable insulating base as indicated in Fig. 4 of the drawings. The cylinder 29 has an outlet sleeve 31 at its top in which a sleeve valve 32 is located, the valve 32 having ports whereby when the float 34, which is connected at 33 to the valve 32, lowers, the ports will effect communication between the atmosphere and the interior of the cylinder 29.

35 is an air vent that is controlled by a check valve 36.

38 is the service stand pipe to which the laterals 39 are connected, it being understood that the lateral ducts or pipes 39 are in communication with faucets or other valved outlets.

40 designates one of the valved outlets for the pipe 38 and 41 is a connecting T in the pipe 10 and with which a by-pass valve 42 is connected, the valve 42 being piped at 43 to the water main 3, whereby water may pass from the T 41 through the valve 42 into the main in the event that the pump 4 is supplying more water than is being used or drawn from the opened discharges of the pipe 38. The pipe 38 and its top end connects with the discharge outlet of the cylinder 15.

So far as described, the manner in which the invention operates is as follows: Assume the pipe 10 and the cylinders 15 and 29 to contain water as indicated in Fig. 2 of the drawings. At this time the float 34 will hold the valve 32 closed, while the check 36 will accomplish the same act for the vent 35. The float 18 will be held across the outlet 17 to close it. The rod 21 will be elevated to open the electric circuit between the contacts 27, and 28, thus rendering the motor 5 non-operative. As soon as water is permitted to flow through the pipe 38 by reason of the opening of a valve or faucet, the water current will flow through the cylinder 15 in a downward direction, thus forcing the float 18 downwardly from the position shown in Fig. 2 to the position shown in Fig. 3, thereby closing the electric circuit between the contacts 27 and 28 and setting the motor 5 into operation to drive the pump 4 and continue the flow of water as indicated in the direction of the arrow in Fig. 2. As soon as the pump begins operation and the outflow of water is less than the capacity of the pump, the water pressure within the cylinder 15 will cause the water to ascend into the chamber 29 to again raise the float 34 and close the vent 32, at which time the air cushion in the top of the cylinder 29 will prevent the further entrance of water. Now as long as the water is being drawn from the pipe 38 the water current or dynamic force generated by the flow of water frictionally acting on the float 18 will keep it down and hence keep the electric motor circuit closed. Immediately, however, that the water flow through the pipe 38 is stopped, there will be no current of water in the cylinder 15 and hence the dynamic force of the water will no longer be present. The float 18 will then rise to the position shown in Fig. 2 and break the pump motor circuit to stop the pump.

From the foregoing description taken in connection with the accompanying drawings, it is thought the complete construction, operation and advantages of the invention will be understood by those skilled in the art.

What I claim is:—

1. In a system of water distribution, a motor driven pump, a pipe line from the pump to the place or places of discharge, and means in said pipe line operable by the flowing current of water for bringing the motor into action, and means for opening and closing the pipe line at the place of discharge to start and stop the flow of water and thereby effect said pump motor operation, and means operable upon the cessation of flow of the water for operatively disconnecting the pump motor.

2. In a water distributing apparatus, the combination with the source of water supply, of a pump connected with the source of supply, a pump actuating mechanism, a stand pipe into which the pump delivers, a controller located at the highest point of the system into which the stand pipe delivers, said controller including a closed cylinder through which the water from the stand pipe is adapted to flow, an offtake pipe from such cylinder, a valved outlet from the offtake pipe, and means carried by said cylinder and operative upon the opening of said valved outlet for setting the pump actuating mechanism into operation.

3. In a water distributing apparatus, the combination with the source of water supply, of a pump connected with the source of supply, a pump actuating mechanism, a stand pipe into which the pump delivers, a controller located at the highest point of the system into which the stand pipe delivers, said controller including a closed cylinder through which the water from the stand pipe is adapted to flow, an offset pipe from such cylinder, a valved outlet from the offtake pipe, and means carried by said cylinder and operative upon the opening of said valved outlet for setting the pump actuating mechanism into operation and a by-pass around the pump for returning surplus water to the source of supply.

4. In a system of water distribution, a source of water supply, a pumping apparatus for pumping the water from the source of supply and including a pump and its actuating mechanism, a stand pipe into which the pumping apparatus delivers the water under pressure, a service pipe, and valved outlets connected with said service pipe, a pump actuating mechanism controller connected between said service pipe and said stand pipe, said controller including a cylinder through which the water passes, a float in said cylinder, a controlling device carried by said cylinder and operatively connected with said float whereby when said float is in one position, said controlling device will render said pumping mechanism non-operative, said float adapted to move under the influence of the flowing water to set said pumping mechanism into operation upon opening a service pipe outlet.

5. In a system of water distribution, a source of water supply, a pumping apparatus for pumping the water from the source of supply and including a pump and its actuating mechanism, a stand pipe into which the pumping apparatus delivers the water under pressure, a service pipe, and valved outlets connected with said service pipe, a pump actuating mechanism controller connected between said service pipe and said stand pipe, said controller including a cylinder through which the water passes, a float in said cylinder, a controlling device carried by said cylinder and operatively connected with said float whereby when said float is in one position, said controlling device will render said pumping mechanism non-operative, said float adapted to move under the influence of the flowing water to set said pumping mechanism into operation upon opening a service pipe outlet, and means for setting up a temporary flow of water through said cylinder after a service pipe outlet has been opened and prior to the starting of the pumping mechanism.

6. In a system of water distribution, a source of water supply, a pumping apparatus for pumping the water from the source of supply and including a pump and its actuating mechanism, a stand pipe into which the pumping apparatus delivers the water under pressure, a service pipe, and valved outlets connected with said service pipe, a pump actuating mechanism controller connected between said service pipe and said stand pipe, said controller including a cylinder through which the water passes, a float in said cylinder, a controlling device carried by said cylinder and operatively connected with said float whereby when said float is in one position, said controlling device will render said pumping mechanism non-operative, said float adapted to move under the influence of the flowing water to set said pumping mechanism into operation upon opening a service pipe outlet, and means for setting up a temporary flow of water through said cylinder after a service pipe outlet has been opened and prior to the starting of the pumping mechanism, said last named means including a second cylinder in communication with said first mentioned cylinder, and an air vent for said second cylinder and means for controlling said air vent.

7. In a water distributing system, a source of supply, a motor driven pump connected thereto, a pipe into which the pump delivers, a controller into which the pipe delivers, a service pipe into which the controller delivers, valved outlets for said service pipe, said controller including a buoyant member, and a connection between said member and the motor, said buoyant member being movable by the action of the flowing current of water through the controller when a service pipe outlet is opened to start the flow of water.

ALFRED T. WARREN.

Witnesses:
F. L. Brockway,
Neal D. Abel.

Copies of this patent may be obtained for five cents each, by addressing the "Commissioner of Patents, Washington, D. C."